United States Patent [19]

Hayashi et al.

[11] Patent Number: 4,809,885

[45] Date of Patent: Mar. 7, 1989

[54] HIGHLY VISCOUS MATERIAL COATING APPARATUS

[75] Inventors: Sensuke Hayashi; Yasuo Tokushima; Kouji Ota; Hirofumi Hashimoto; Kajuyosi Utiyama; Masahiro Umeda; Kaoru Kondo, all of Toyota; Yosifumi Kaji, Okazaki, all of Japan

[73] Assignee: Toyota Jidosha Kabushiki Kaisha, Toyota, Japan

[21] Appl. No.: 97,260

[22] Filed: Sep. 17, 1987

Related U.S. Application Data

[63] Continuation of Ser. No. 841,616, Mar. 20, 1986, abandoned.

[30] Foreign Application Priority Data

Mar. 20, 1985 [JP] Japan ................................ 60-054333

[51] Int. Cl.[4] ............................ B05C 1/00; B25J 9/10

[52] U.S. Cl. .................................... 222/174; 222/571; 222/173; 118/207; 118/252; 118/305; 118/410; 901/10; 901/43; 901/46; 414/720

[58] Field of Search ........................ 901/43, 45, 46, 10, 901/50; 118/410, 411, 207, 252, 323, 305, 697; 414/744 R, 720; 222/173, 174, 571, 108; 134/172, 180; 384/609; 403/359

[56] References Cited

U.S. PATENT DOCUMENTS

| | | | |
|---|---|---|---|
| 660,881 | 10/1900 | Allen | 118/252 X |
| 1,914,204 | 6/1933 | Herold et al. | 384/609 |
| 2,721,008 | 10/1955 | Morgan, Jr. | 222/571 X |
| 2,816,308 | 12/1957 | Schultz | 118/252 X |
| 2,900,952 | 8/1959 | Perry | 118/207 |
| 3,530,273 | 9/1970 | Bollinger et al. | 901/10 X |
| 3,594,540 | 7/1971 | Weinfurt | 901/10 X |
| 4,015,560 | 4/1977 | Paul | 118/410 X |
| 4,048,951 | 9/1977 | Tamura | 118/697 X |
| 4,153,260 | 5/1979 | Joyner | 403/359 X |
| 4,166,941 | 9/1979 | Cecil | 901/46 X |
| 4,199,896 | 4/1980 | Lehman | 134/180 X |
| 4,205,791 | 6/1980 | Dooley | 901/43 X |
| 4,239,431 | 12/1980 | Davini | 118/697 X |
| 4,347,875 | 9/1982 | Columbus | 222/108 X |
| 4,356,216 | 10/1982 | Gailey et al. | 118/411 X |
| 4,378,959 | 4/1983 | Susnjara | 901/43 X |
| 4,498,414 | 2/1985 | Kiba et al. | 901/46 X |
| 4,561,825 | 12/1985 | Sakata | 901/35 X |
| 4,564,410 | 1/1986 | Clitheros et al. | 118/697 X |
| 4,698,005 | 10/1987 | Kikuchi et al. | 118/410 X |

FOREIGN PATENT DOCUMENTS

| | | |
|---|---|---|
| 2121561 | 12/1983 | United Kingdom . |

*Primary Examiner*—Charles A. Marmor
*Assistant Examiner*—Stephen Parker
*Attorney, Agent, or Firm*—Oblon, Fisher, Spivak, McClelland & Maier

[57] ABSTRACT

A highly-viscous material coating apparatus for use, e.g. in an automobile coating process, to coat a joint of a workpiece, may be mounted on a robot. It provides improved operation where the workpiece provides a reference surface parallel to the joint, where the workpiece provides a reference surface displaced from the joint at varying distances along the length of the joint, and where the workpiece provides no reference surface. Where a reference surface is available, an extendable spring-biased guide pin of the apparatus moves along the reference surface, and any positional errors are compensated-for by action of the spring. If the distance between the reference surface and the joint varies, the varying distance may be compensated for by various disclosed practices. The apparatus also can be used where no reference surface is provided by retracting the guide pin with respect to the nozzle and by controlling the robot so as to direct the nozzle to the joint. A conventional nozzle may be adapted to dispense a highly-viscous liquid without splattering or otherwise marring the surface of the workpiece by providing the nozzle with a frusto-conic recess.

11 Claims, 13 Drawing Sheets

Fig 38
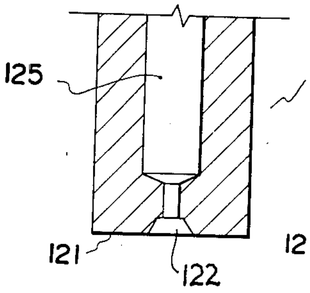
Fig 39
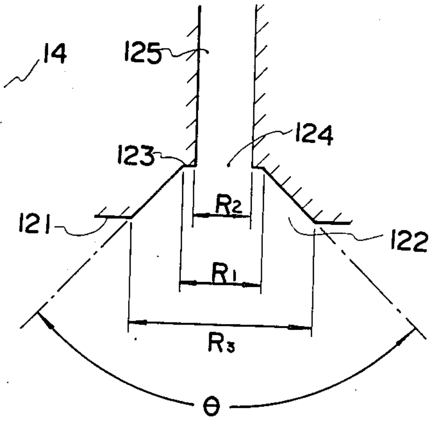
Fig 41
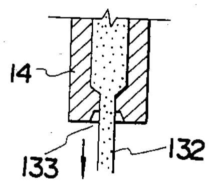
Fig 40
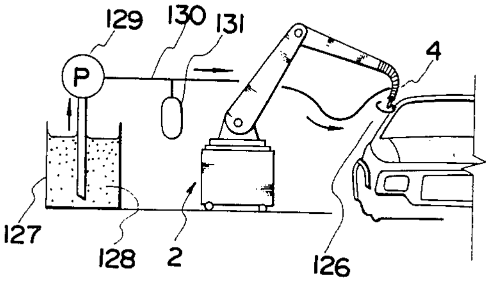
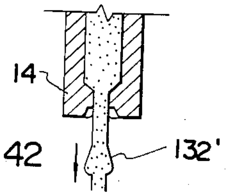
Fig 42
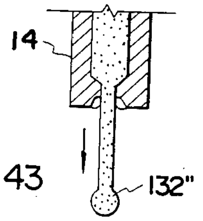
Fig 43

HIGHLY VISCOUS MATERIAL COATING APPARATUS

This application is a continuation of application Ser. No. 841,616, filed on Mar. 20, 1986, now abandoned.

BACKGROUND OF THE INVENTION

1. Field of the Invention

The techniques disclosed herein relate to the technical field of coating joint portions of body panels of an automobile with a sealer material.

2. Description of the Prior Art

As is generally known, for example, in a body coating step used in an automobile manufacturing factory, a filler consisting of a highly viscous material, such as a sealer, is applied as a sealing material along a seam between predetermined panels, which have been joined by spot welding, so as to form an automobile body. In this coating step, measures for preventing leakage of rainwater around the body and techniques for preventing rusting and corrosion thereof are employed.

A conventional highly viscous material coating apparatus may be adapted to automatically coat the joint portions of such panels with a sealer material. For example, a playback-type coating robot may be used. However, when such conventional apparatus is used, it is difficult to coat the joint portions of the panels with a sealer material as accurately and as quickly as in a similar manual coating operation while maintaining the relative positions of the automobile body and the coating apparatus during the coating operation. This difficulty is ascribed to the following. It is unavoidable in practice that the joint between the panels in each unit of an automobile body deviates to a considerable extent due to accumulated error caused by deviation of a body transfer conveyor, failure in alignment of the body with a carriage on which the body is loaded, failure in alignment of the body with a jig when the body is loaded on the carriage, and assembly error within the body itself.

Above all, the door, hood and trunk lid in an automobile body cannot accurately be coated with a sealing material, not only because of such accumulated error but also because of fitting error. Namely, unlike a conventional manual coating operation, conventional automatic coating apparatus is substantially incapable of compensating for such errors and of applying a sealing material accurately and narrowly along a joint between the body panels. This makes it impossible to obtain a satisfactorily high coating accuracy.

Under the circumstances, the following systems have recently been devised and used for coating an automobile body with a highly viscous material.

One such system is a system for setting a coating apparatus on a body shell or a door panel fitted therein, detecting the deviation of the position of the coating apparatus as set, adding the detected quantity of positional deviation as a correction quantity to a program that operates the coating apparatus, and carrying out a coating operation with the positional deviation eliminated. Another such system detects positional deviation of a joint of body panels from a target point on the coating apparatus and inputs a signal representative of the detected deviation into the coating apparatus for use as a coating-apparatus controlling feedback signal, thereby to control the apparatus so that the target point is aligned with the joint.

However, when the coating apparatus in these types of conventional systems are used for coating a curved surface of a workpiece, especially a structure having a complicated three-dimensional curved surface such as an automobile body, the position detector and controller are complicated in construction and are very expensive. Moreover, in such former systems, the position detector requires a certain period of time to carry out the position detecting operation and to correct the operating program. This causes inconvenience in the coating operation, i.e. loss of operation time of a robot. In the latter system, it is necessary to provide a detector on, or in the vicinity of, the coating apparatus. Therefore, the detector interferes with a member of the body being coated so as to greatly restrict the range of the coating operation.

In order to eliminate these inconveniences which adversely affect the practical operation of the coating apparatus, a system has also been employed that is provided with a plurality of types of coating apparatus which are suitably used for coating different types of parts of a workpiece, to enable the coating apparatus to be applied to the largest possible number of portions of an automobile body. However, arranging the coating apparatus in this manner not only causes an increase in the number of different coating apparatus that are required but also an increase in the number of coating steps. Also, such a practice increases both the dimensions of the space required and the manufacturing cost. Since different coating apparatus are used for different types of workpiece portions to be coated, the adaptability of these systems to different types of automobiles is lowered. Furthermore, the robots, as coating apparatus, make many useless actions, and the number of required coating steps increases.

At present, there are a very limited number of robots which are capable of coating a workpiece having a complicated three-dimensional curved surface, such as a door assembly, with high accuracy and at a speed as great as that at which a conventional manual coating operation is carried out. The equipment is greatly limited. Moreover, for a sealing action of the robot, the coating apparatus is required to have an accuracy of around ±1–2 mm with respect to an instruction at each point. Consequently, a number of troublesome steps are required for providing such instructions.

Under the circumstances, there has been a demand for the development of a slim, compact, inexpensive, versatile, and easily-operable coating apparatus having the advantage of using a commercially-available non-modified industrial robot of small volume and capable of carrying out coating and profile coating operations with respect to each portion of a workpiece with the required sufficiently-high accuracy, without limiting the coating steps, and without interfering with a workpiece, even a workpiece having a complicated three-dimensional construction such as an automobile body.

SUMMARY OF THE INVENTION

The present invention builds on the basis of the above-mentioned conventional techniques and solves the technical problems of applying a highly viscous material to a workpiece such as an automobile body having a complicated three-dimensional curved surface. An object of the present invention is to provide a light, excellent, simple and compact,· freelyoperable, widely usable and highly reliable coating apparatus for highly viscous material, the apparatus being capable of mounting and use on a commercially-available industrial robot without special modification. The apparatus is capable of carrying out coating and profile coating operations with respect to a seam on non-limited portions of a workpiece having a complicated three-dimensional construction, such as an automobile body, each operation being performed with a required and sufficient accuracy and at high speed. Interference of a gun with any member of the workpiece is avoided. The apparatus is capable of preventing an unduly large operating force from being applied to the apparatus during a coating operation, is substantially free from problems, and provides an inexpensive coating system. The number of coating steps, robots, and adjusting and instructing steps may be minimized. Accordingly, the apparatus contributes much to various kinds of manufacturing industries in which a coating process is used.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 38 is a schematic sectional view of a nozzle tip;

FIG. 39 is an enlargement of a portion of the nozzle tip of FIG. 38;

FIG. 40 is a schematic diagram showing a highly viscous material coating operation; and FIGS. 41, 42 and 43 are schematic diagrams showing operations of discharging a highly viscous material from nozzle tips.

DESCRIPTION OF THE PREFERRED EMBODIMENTS

Figure 1:
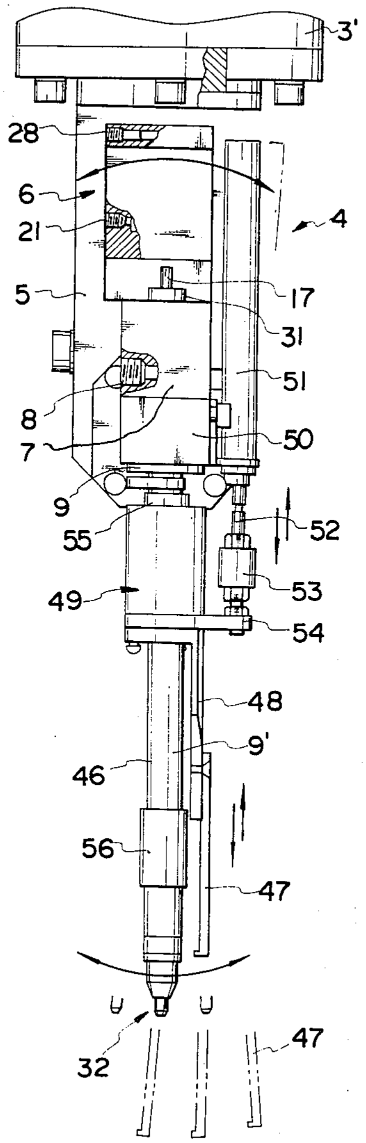
FIG. 1 is a front elevation of a first embodiment of a highly viscous material coating apparatus.
Figure 2:
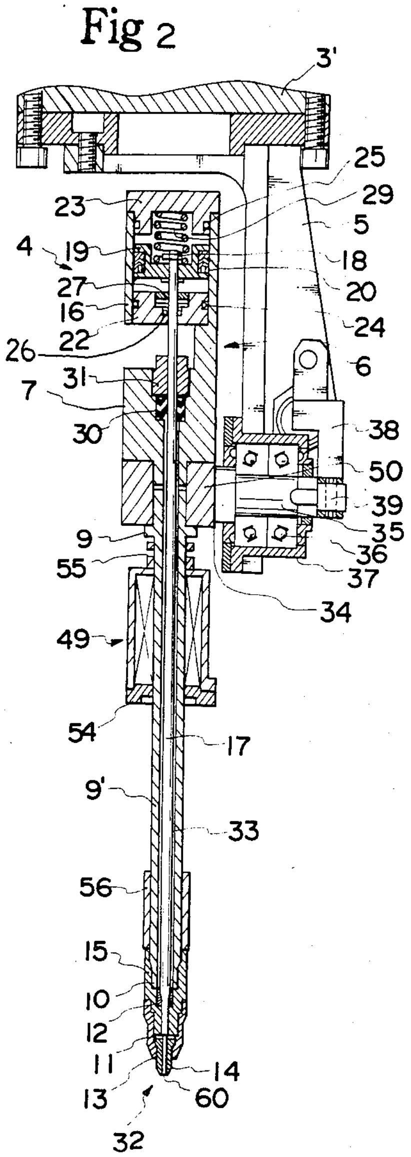
FIG. 2 is a side elevation, partly in section, of the apparatus.
Figure 3:
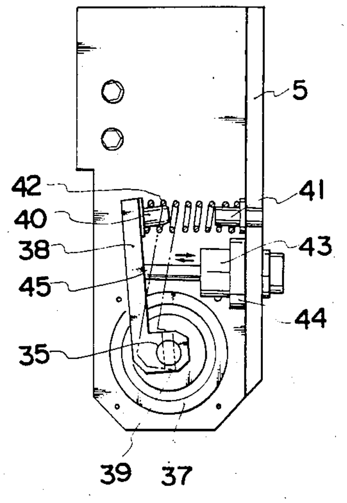
FIG. 3 is an enlarged rear elevation of a pivotal unit of the apparatus.
Figure 4:
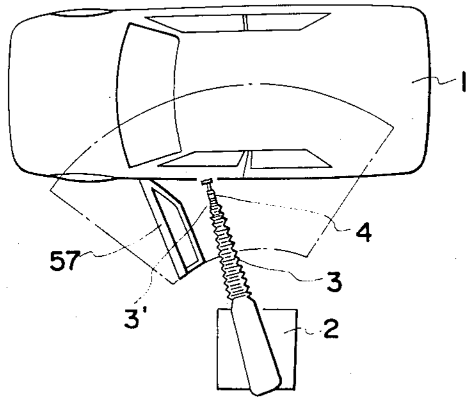
FIG. 4 is a top view showing an operation for applying a highly viscous material to an automobile.

FIG. 4 shows a sealing unit including a robot 2 having at least three operating shafts (six in this embodiment) and including a wrist 3 and a coating apparatus 4 according to the current invention mounted on a rotary shaft 3' of the wrist 3. The sealing unit applies a sealer to a predetermined portion of an automobile body 1. The details of the construction of the coating apparatus 4 are as shown in FIGS. 1, 2 and 3.

The apparatus 4 comprises a base portion mounted on the rotary shaft 3' and an airless gun mounted on the base portion. The airless comprises means for discharging a sealing material in the form of a highly viscous material. The base portion includes base plate 5, and the gun includes a gun body 6 comprising, in part, a block 7.

A sealer supply port 8, from which a sealing material (not shown) is fed, is provided in a lower portion of a side wall of the gun body 6. A gun extension 9 is fixed on the lower portion of the gun body 6 by bolts (not shown).

The lower portion of the gun extension 9 forms a nozzle shaft 9', extending downward to nozzle 32. A nozzle base 12, in which a needle seat 11 is provided, is firmly screwed to the lower end portion of the nozzle shaft 9'. A packing 10 is provided. A nozzle tip 14 to which a nozzle holder 15 is screwed is fixed under pressure to the nozzle base 12 with a nozzle packing 13 being held between the nozzle tip 14 and nozzle holder 15.

A cylinder 16 is formed in an upper portion of the gun body 6. A needle shaft 17 extends downward to the needle seat 11 and upward to a piston 19, where it is secured to the piston 19 by a nut 18. Piston 19 is movable in the cylinder 16 and is provided with a ring packing 20 for that purpose.

Gun-operating air is fed through a port 21 provided in an intermediate portion of a side wall of the gun body. Port 21 communicates with cylinder 16.

A cylinder base 22 is fixed at the lower portion of the cylinder 16 by bolts (not shown). A cylinder cap 23 is fixed, also by bolts, at the upper portion of the cylinder 16. The base 22 and cap 23 are received air-tightly in the cylinder 16 and are provided with sealing O-rings 24, 25, respectively. An O-ring 26 is provided at a location where the needle shaft 17 penetrates the cylinder base 22, and a plate 27 is sealingly fixed on the O-ring 26.

Gun-releasing air is fed through a port 28, which communicates with the cylinder 16. Port 28 is provided in the portion of the gun body 6 which is near the cylinder cap 23. A compression spring 29 for urging the piston 19 downward is provided between the cylinder cap 23 and piston 19.

To secure a good seal between the sealer supply port 8 and a passage 33, formed between an inner wall of nozzle shaft 9' and needle shaft 17, a V-packing 30 is disposed in the interior of the gun body 6, a V-packing packing holder 31 being set on the V-packing 30. Thus, the sealing of the passage 33 is assured.

According to the present invention, the axis of the nozzle 32 (i.e. the axis of the nozzle tip 14) and that of the rotary shaft 3' of the wrist 3 of the robot 2 are aligned with each other at least during rotary movement of the rotary shaft 3'.

A pivot 35 is fixed on a rear side 34 of a bracket 50 and projects rearwardly therefrom. The pivot 35 is supported by a pivot bearing holder 37, which is provided with ball bearings 36 and is fixed on the base plate 5 so that the block 7, which extends from the cylinder cap 23 on the gun body 6 to the nozzle 32, can be turned within a predetermined angle.

As shown in FIGS. 2 and 3, a pivotable plate 38 is mounted on the rear end of the pivot 35 and fixed thereto by a pin 39. A guide bush 40 extends unitarily from a free end portion of the pivotable plate 38 so as to project therefrom as shown in FIG. 3. Guide bush 40 is opposed to a guide bracket 41, which is fixed to the base plate 5. A spring 42 for urging the pivotable plate 38 so as to turn the same is provided between the guide bush 40 and the guide bracket 41, the spring 42 urging the plate 38 so that the plate 38 is pulled toward the guide bracket 41.

An air cylinder 43 for restricting the pivotal movement of pivotable plate 38 is fixed on the base plate 5 by a cylinder bracket 44 so as to be opposed to an intermediate portion of the pivotable plate 38. The free end of a rod 45, which extends forward from the cylinder 43, is opposed to a central section of the pivotable plate 38, to turn the plate 38.

A spline groove 46 is provided on a portion of the outer side surface of the nozzle shaft 9' which is between the lower end of the gun extension 9 and the portion of the shaft 9' on which the nozzle base 12 is provided. A linear motion bearing 49 engages the spline groove 46 in such a manner that the bearing 49 can slide in the axial direction of the nozzle shaft 9' without turning thereon. Guide pin 47 extends downward to the vicinity of nozzle 32 from backet 48 of linear motion bearing 49.

A guide cylinder 51 in the form of an air cylinder type actuator is provided on bracket 50, which is a base portion of the pivot 35 and which is fixed on the gun body 6. A floating joint 53 is provided at the lower end of a rod 52 extending from the guide cylinder 51 and is fixed to a base end of a bearing holder 54 of the linear motion bearing 49. The guide pin 47, extending unitarily from the bracket 48, is thereby movable up and down by the bracket 48 along the nozzle shaft 9' without rotation about the nozzle shaft 9'.

Reference numerals 55, 56 denote stoppers, which are provided on the upper and lower end portions of the nozzle shaft 9' so as to restrict the axial stroke of the linear motion bearing 49.

The rotary shaft 3' of the wrist 3 of the robot 2 (which has at least three shafts) may be turned to cause the guide pin 47 to carry out a guiding operation, as described below. An important feature of the structure according to the current invention is that, during such guiding operation, the axis of the rotary shaft 3' is aligned with the axis of nozzle 32, i.e., of nozzle tip 14.

When the range of operation of the coating apparatus including the robot 2 as above-described is a fan-shaped area as shown by single-dot chain lines in FIG. 4, a joint of a panel which is at a predetermined portion of an automobile body 1 is coated with a sealing material sprayed on the joint by the sealing apparatus. A door panel 57 and a part of the floor are included in the fan-shaped area in which the sealing operation can be carried out.

Figure 5:
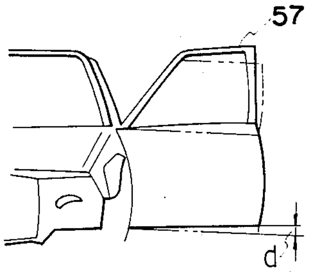
FIG. 5 is a front elevational view illustrating an assembly error in a door assembly.

As previously described, the door panel 57 of an automobile, for which a sealing material-coating operation is to be carried out, may actually be displaced (mainly in the vertical direction) by an extent d due to a fitting error, as shown by double-dot chain lines in FIG. 5. The door panel 57 must be coated with a sealing material more accurately than the floor. Under the circumstances, if the robot 2 has sufficient accuracy to coat the floor with a sealing material, the door panel 57 can also be coated with sufficient accuracy by the same robot 2 and coating apparatus 4.

In an automobile body of typical construction, the floor has no reference contact surface for use by a coating gun. (An example of such a reference surface is hemmed portion 58 of door panel 57, shown in FIG. 7.) In contrast, the door panel 57 usually has a hemmed portion. Therefore, the outer circumferential portion of the door panel can be used as a reference surface.

First, the application of a sealing material to a floor having no reference surfaces will be described. The high-pressure air is supplied from a high-pressure air supply source (not shown) through an air pipe into the guide cylinder 51 of the coating apparatus 4 of the above-described embodiment to retract the rod 52 so as to lift floating joint 53 and bearing holder 54, thereby lifting linear motion bearing 49 along the spline groove 46 of the nozzle shaft 9' without turning the bearing 49. Consequently, the guide pin 47 slides up to retreat to a position in which it is opposed to nozzle 32. Meanwhile, the pivotal movement restricting cylinder 43 is operated by high pressure air as shown in FIG. 3 to move its rod 45 back and forth, and the pivotable plate 38 is moved forward and backward owing to the movement of the rod 45 in the pivotal movement restricting cylinder 43 and the tensile force of the tension spring 42. This causes the block 7 to be turned around the axis of the pivot 35, so that the nozzle shaft 9′ is also turned to give the robot 2 an instruction for carrying out a coating operation. A sealing material is then fed from the supply port 8, and high-pressure air is fed from the gun-operating air supply port 21. The needle shaft 17 with the piston 19 is thereby lifted against the compression spring 29, and the sealing material is ejected from the nozzle 32 to carry out a coating operation.

If the coating apparatus is in this condition, the actions of the free end of the nozzle 32, which are in strict accordance with the actions of the robot 2, can be obtained even when the object to be coated is the floor having no reference surfaces, i.e., even when no profiling actions occur. Since there are no interfering structures around a free end of the nozzle 32, the coating can be accomplished over a wide range of area around the floor.

In order to seal the door panel 57 having a portion, such as a hemmed portion, which forms a reference surface as mentioned above, the high pressure air is fed to the guide cylinder 51 to lower the rod 52 and move the linear motion bearing 49 down along the groove 46 in the nozzle shaft 9′ without turning the bearing 49. The guide pin 47 together with the bearing holder 54 are thereby moved forward so as to engage the reference surface at the outer side of the hemmed portion 58 which extends substantially parallel to the sealing line. Thus, the coating apparatus 4 compensates for deviation of the robot 2 from a regeneration path and any error in the actions thereof with respect to the instructions. In the pivotal movement restricting cylinder 43, the rod 45 is moved back and forth by the high-pressure air simultaneously with the action of the guide pin 47 to laterally pivot the plate 38 as shown in FIG. 3. Then an instruction is given for making coating actions, and a coating operation is carried out.

Figure 6:
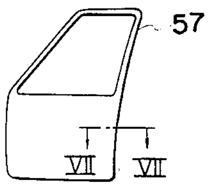
FIG. 6 is a side elevation of a door assembly.
Figure 7:
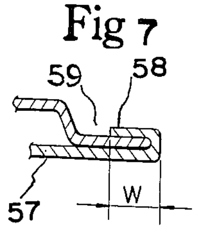
FIG. 7 is a horizontal cross-section taken along line VII—VII of FIG. 6.
Figure 8:
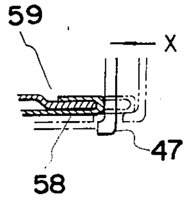
FIG. 8 is a side elevation of a guide pin in operation against a joint of a door assembly.

The door panel 57 has a hemmed portion 58 at the outer circumferential portion thereof as shown in FIGS. 6 and 7. The coating apparatus 4 is turned in the X-direction, which is at right angles to the joint 59 as shown in FIG. 8, and the guide pin 47 is pressed against the edge of the hemmed portion 58 by the tensile force of the pivoting spring 42 to stop the pivotal movement restricting cylinder 43. A coating action is made with the guide pin 47 contacting the outer side surface of the hemmed portion 58. Therefore, even when the door panel 57 deviates as shown by double-dot chain lines in FIG. 8, and even when the accuracy of action of the robot 2 is low, so as to cause an error to occur in the locus of movement of the robot 2, the automatic seal-coating of the portion of the panel which is a predetermined distance away from the edge thereof can be done accurately, although the range of application is limited to a certain portion of the reference surface of the guide pin 47.

Figure 10:
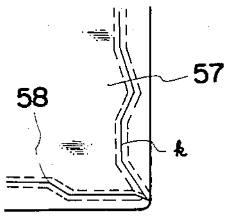
FIGS. 10 and 11 are rear elevations of a combined section of the hemmed portion of the panel.
Figure 11:
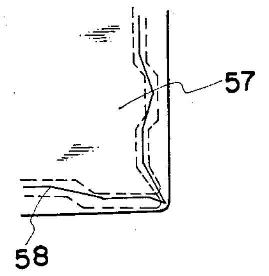

The width W of the hemmed portion shown in FIG. 7 is 10–12 mm in nearly all sections thereof. However, as shown in FIGS. 10 and 11, the width k varies up to around 5 mm in some cases at a bent section of the panel and an end section of the hemmed portion 58.

In the mode of sealing operation which is employed for dealing with these cases, the following procedure is followed.

Figure 12:
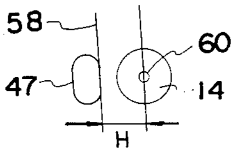
FIGS. 12 and 13 are schematic diagrams of a hemmed portion, a guide pin and a nozzle tip.
Figure 13:
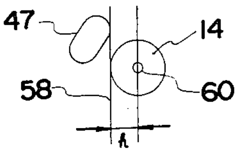

In a normal case, which was described with reference to the mode shown in FIG. 8 and is also illustrated in FIG. 12, the guide pin 47 is moved to the hemmed portion 58 at right angles thereto, and the distance H is usually set to be a maximum value, with the guide pin 47 assuming a posture such that a straight line connecting the guide pin 47 and the bore 60 in the nozzle tip 14 makes an angle of 90 degrees with the edge of the hemmed portion 58. In the case where the width k varies, the pivotal movement restricting cylinder 43 is stopped with the guide pin 47 assuming this posture, and a stopper (not shown) or a clutch is used to fix the posture of the gun body 6 with respect to the base plate 5, so that the robot assumes an initial posture in which the axis of the nozzle 32 and the axis of the rotary shaft 3′ of the wrist 3 of the robot 2 are aligned with each other as previously mentioned. The rotary shaft 3′ of the wrist 3 is then turned at a predetermined angle to turn the coating apparatus 4, so that the contact surface of the guide pin 47 engages the hemmed portion 58 with an inclination, as shown in FIG. 13. Consequently, the distance h between the bore 60 in the nozzle tip 14 and the edge of the hemmed portion 58 becomes less than H ($h<H$), to a predetermined extent. Thus, the sealing operation can be carried out by controlling the distance between the bore 60 in the nozzle tip and the edge line of the hemmed portion 58. This proves that, even if the ejection rate of the sealer from the nozzle bore 60 is kept constant, and even if the distance between the nozzle port 60 and the edge portion of the panel is small, the sealer can be applied sufficiently to the joint 59.

In this embodiment, the axis of the rotary shaft 3′ of the wrist 3 of the robot 2 and that of the nozzle 32, i.e. the bore 60 in the nozzle tip 14, are aligned with each other as mentioned above. Therefore, the distance h can be controlled merely by turning the rotary shaft 3′, and the sealing operation can be carried out accurately with minute variations in the width k being absorbed.

Figure 14:
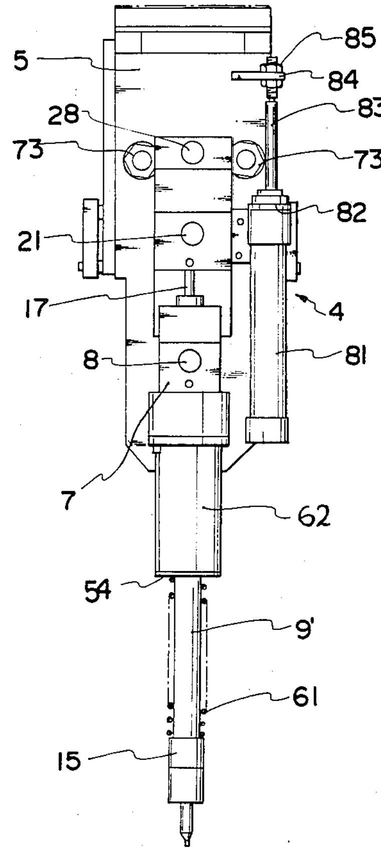
FIG. 14 is a front elevation of a second embodiment of a highly viscous material coating apparatus.
Figure 15:
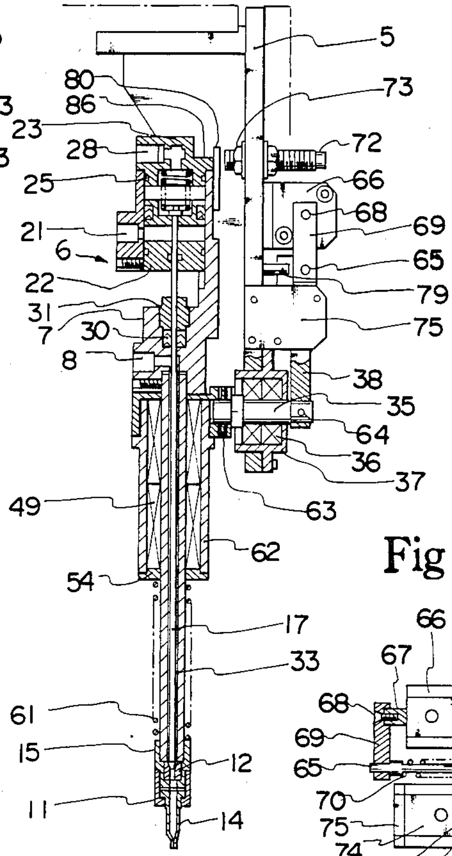
FIG. 15 is a side elevation, partly in section, of the apparatus of FIG. 14.
Figure 16:
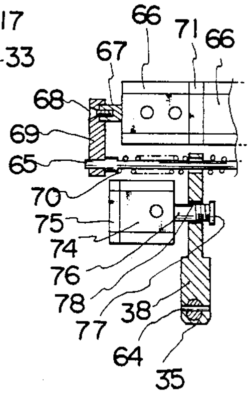
FIG. 16 is an enlarged rear elevation, partly in section, of a pivotal unit.

The coating apparatus 4 in a second embodiment shown in FIGS. 14 and 15 is used to carry out narrow bead sealing of a joint on a panel. The general construction of a block 7 is identical with that of the corresponding part of the embodiment of FIGS. 1 and 2, but these two blocks are different in the following points. A compression spring 61 is provided around a portion of the outer surface of the nozzle shaft between the bearing holder 54 and the nozzle holder 15, so as to urge the nozzle unit resiliently in the downward direction.

A first end of a pivot 35 is fitted in one side of a casing 62 of a linear motion bearing 49 and is fixed therein by a pin 63, the pivot 35 being supported in a pivot holder 37, which houses ball bearings 36 therein, and which is centrally mounted on a lower section of base plate 5.

A first end of a pivotable plate 38 is fitted on the second end of the pivot 35 and fixed by a pin 64. A connecting rod 65 is slidably received in an opening through the second end of the pivotable plate 38. Both ends of the connecting rod 65 are fixed to intermediate plates 69, 69 which are joined by screws 68, 68 to rods 68, 67 in pivoting cylinders 66, 66, which comprise pivoting means.

Springs 70, 70 are provided around the portions of the connecting rod 65 which are between the pivotable plate 38 and the intermediate plates 69, 69. The pivoting cylinders 66, 66 are fixed to the base plate 5 by a bracket 71. A pair of proximity switches 72, 72 are fixed by lock nuts 73, 73 to the portion of the base plate 5 which is above the cylinders 66, 66.

The pivotable plate 38 is provided at the substantially central portion thereof with a pivotable movement restricting cylinder 74, which is fixed on the base plate 5 by a bracket 75. A restriction flange 77 is screwed firmly to the free end portion of a rod 76 of the pivotal movement restricting cylinder 74, and the rod 76 of the cylinder 74 passes through a hole 78 formed in the pivotable plate 38.

The angle of pivotal movement of the pivotable plate 38 is restricted by stoppers 79, 79 fixed to the base plate 5. An operating plate 80 is attached to the gun body 6 so that the proximity switches 72, 72 are operated when the pivotable plate 38 contacts the stoppers 79, 79.

A longitudinal movement restricting cylinder 81 serving as driving means is fixed on the base plate 5 by a bracket 82 having an L-shaped cross-section, as shown in FIG. 14. An extension and contraction restricting plate 84 is screwed to the rod 83 of the cylinder 81 by a nut 85. Plate 84 engages and disengages a recess 86 formed in a side of the upper portion of the gun body 6.

Figure 17:
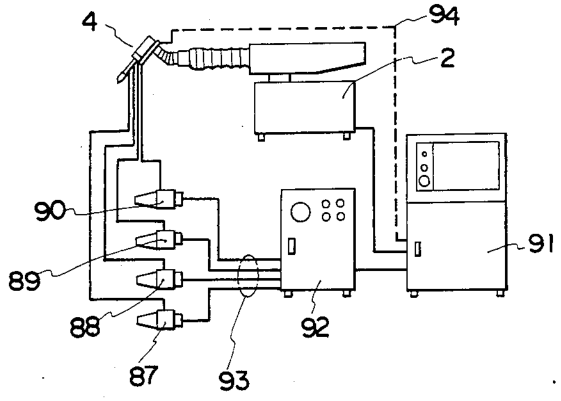
FIG. 17 shows a control unit for a robot.

Shown in FIG. 17 are a robot control board 91, a gun control board 92, an electromagnetic valve 87 for controlling the longitudinal movement restricting cylinder, an electromagnetic valve 88 for controlling the pivotal movement restricting cylinder, an electromagnetic valve 89 for controlling the pivoting cylinder and an electromagnetic valve 90 for turning the gun on and off. Electric signals are sent from board 92 through control lines 93 to turn on and off predetermined ones of the electromagnetic valves and thereby, as desired, there is selected a rightward pressing operation, a leftward pressing operation, a longitudinal position restricting operation, a pivotal movement restricting operation and a gun starting operation. Reference numeral 94 denotes a discharge stopping line.

Figure 18:
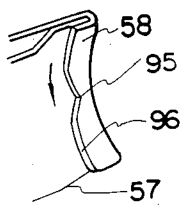
FIG. 18 is a rear view in perspective of a hemmed portion of a door.

The coating apparatus according to this embodiment is used in a case where a sealing material (not shown) is applied, for example, to the hemmed portion 58 of a door 57 of the automobile body 1 shown in FIG. 4 and, in particular, to a joint having a shape like that of a joint 96 on a panel which has a shallow access 95 in a hemmed portion 58 which has an arcuate cross-section, as shown in FIG. 18.

Figure 9:
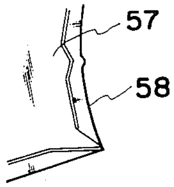
FIG. 9 is a perspective view of a hemmed portion of a door panel.
Figure 19:
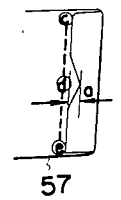
FIG. 19 is an elevation of the structure shown in FIG. 18.
Figure 20:
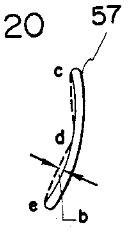
FIG. 20 illustrates the starting of the coating of combined sections of the hemmed portions of the panels in a door assembly.

In order to bring the free end portion of the nozzle of the coating apparatus 4 into contact with this joint 96 on the panel and to coat the same with a sealer, the electromagnetic valve 87 for the longitudinal movement restricting cylinder and the electromagnetic valve 88 for the pivotal movement restricting cylinder are turned off, and the pivoting cylinders 66, 66 are operated so that the free end of the nozzle tip 14 descends in the direction of the arrow in FIG. 18, which is the direction in which the free end of the nozzle tip 14 is pressed against the joint 96 on the panel shown in FIG. 9. The free end of the nozzle tip 14 is thus led to a sealing starting point c of the joint 96, as shown in FIGS. 19 and 20. At this starting point, the nozzle of the coating apparatus 4 is pressed against the joint in the direction in which the joint extends, and in the direction which is at right angles to the panel surface, and the instructions for designating a predetermined path of the nozzle tip are given until the nozzle tip has reached a sealing terminating point e. The apparatus is pressed against the joint by a distance not less than the depth a of the recess 95 at least in the direction in which the joint extends, and by a distance not less than the depth b of the curved surface in the direction which is at right angles to the panel surface.

The subsequent actions of the robot 2 can be reproduced as shown by dotted lines in FIGS. 19 and 20. Although the loci of movements of the robot 2, which are shown by these dotted lines, are not parallel in each part to the surface of the recess 95 and the curved surface, the free end of the nozzle tip 14 is moved along the joint 96 on the panel owing to the resilient force of the springs 70, 61 to enable a predetermined sealing operation to be carried out.

When the nozzle tip 14 cannot be brought into contact with the joint 96 on the panel because of the presence of many body members in the vicinity thereof, a sealing material is sprayed onto the joint 96 with the free end of the nozzle tip 14 being separated therefrom, to enable the sealing operation to be carried out normally. In this case, if both the electromagnetic valve 87 for the longitudinal movement restricting cylinder and the electromagnetic valve 88 for the pivotal movement restricting cylinder are turned on, the pivotable plate 38 contacts the stopper 79, and the movement of the nozzle tip 14 is restricted.

Even when, for any reason, the relative positions of the joint 96 of the panel and the wrist 3 of the robot 2 deviate from each other during the coating operation, because of the engagement of the free end of the nozzle tip 14 with the seam, the free end of the nozzle tip 14 moves along the seam 96 due to the resilient force of the springs 61, 70 to carry out a predetermined sealing operation.

If for any reason the free end of the nozzle tip 14 moves away from the joint 96 of the panel, the approach of the operating plate 80 fixed to the gun body 6 is detected by the proximity switches 72, 72, and a discharge prohibiting signal is sent to the robot control board 91 through the discharge stopping signal line 94. The interruption of the discharging of sealing material from the gun body 6 and the actions of the robot 2 can thereby be effected freely at predetermined points in time.

Figure 21:
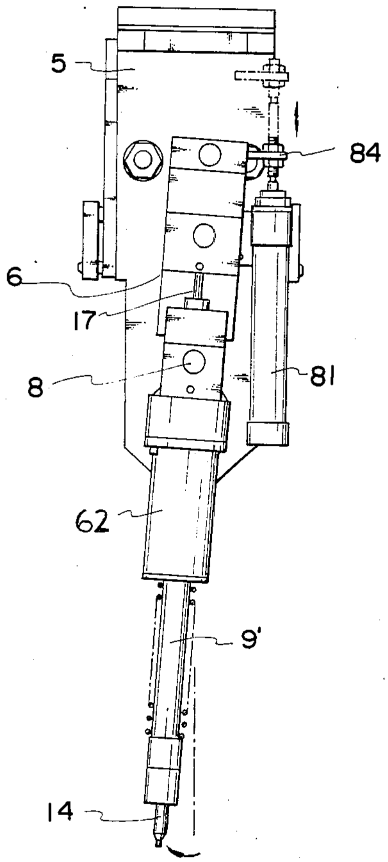
FIG. 21 is a front elevation of the embodiment of FIGS. 14–16 in one possible state of operation.
Figure 22:
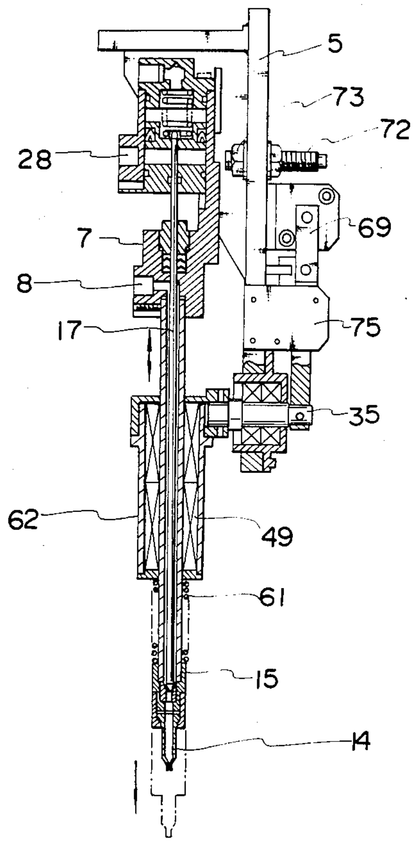
FIG. 22 is a side elevation, partly in section, of the embodiment of FIG'S. 14–16 in a different state of operation.
Figure 23:
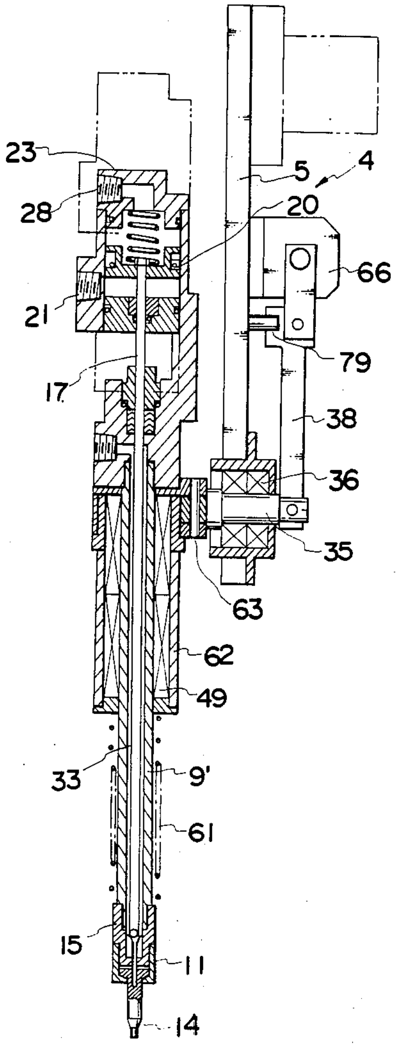
FIG. 23 is a side elevation, partly in section, of a third embodiment of a highly viscous material coating apparatus.
Figure 24:
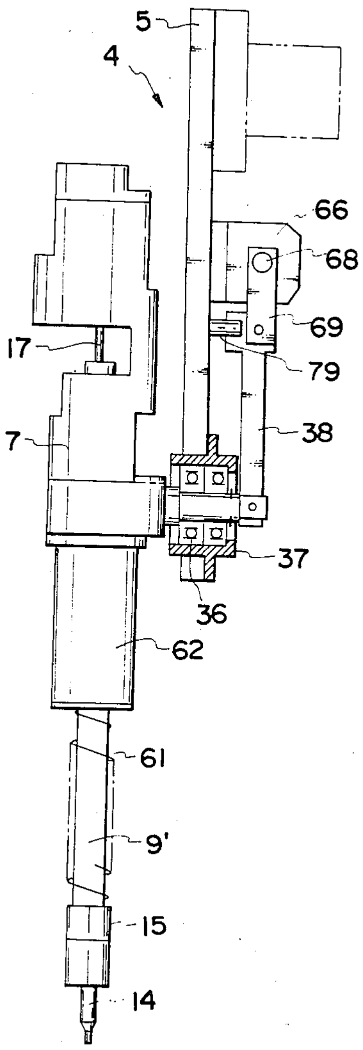
FIG. 24 is a side elevation of the embodiment of FIG. 23.
Figure 25:
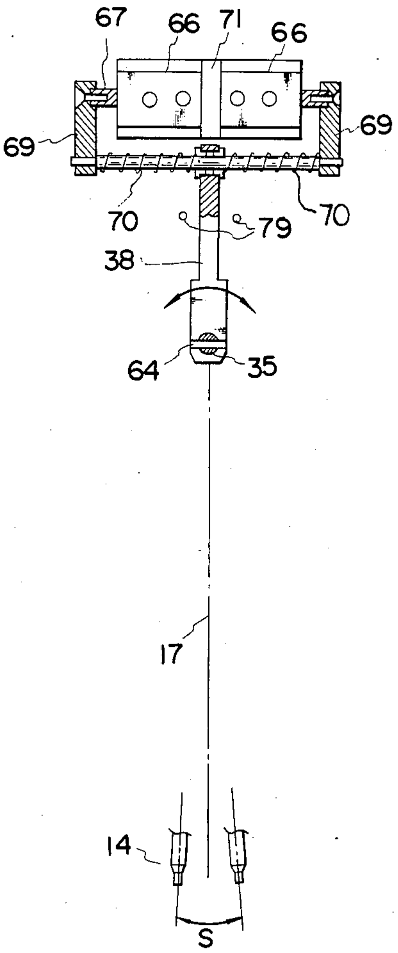
FIG. 25 is a rear elevation, partly in section, of another embodiment of a pivotal unit.

When the gun body 6 is turned in the direction of an arrow in FIG. 21 to reach the position shown in the same figure, the extension and contraction restricting plate 84 is pressed against the gun body 6 by the longitudinal movement restricting cylinder 81, so that the gun body 6 can be properly positioned. Even when the gun body 6 is moved toward that portion of the base plate 5 on which the flange for fixing the wrist 3 thereto is provided, during a predetermined extension and contraction stroke as shown in FIG. 22, the gun body 6 can be moved in the direction of an arrow in the drawing by the extension and contraction restricting plate 84 acted upon by the longitudinal movement restricting cylinder 81, to properly position the gun body 6.

An embodiment shown in FIGS. 23–27 omits the longitudinal movement restricting cylinder 81 and the pivotal movement restricting cylinder 74 for the pivotable plate 38, which are provided in the previous embodiment of FIGS. 14–22.

Although the robot 2 does not move in strict accordance with a bent edge of a panel, the nozzle tip 14 moves pivotally along the joint 96 due to the resilient force of the springs 70, 70, 61 to carry out a predetermined sealing operation.

Figure 26:
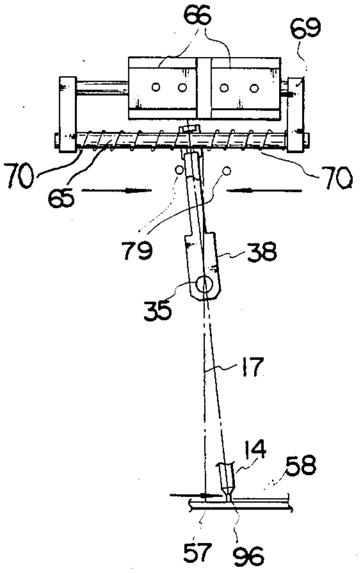
FIG. 26 is a rear elevation illustrating pivotal movement of the pivotal unit of FIG. 25.

In the case where the nozzle tip 14 is turned to be pressed against the gun body in the direction shown in FIG. 26, the pivoting cylinders 66, 66 are operated in the direction of an arrow in the drawing. Therefore, leftward and rightward pivotal strokes of the free end of the nozzle tip 14 are not required.

Figure 27:
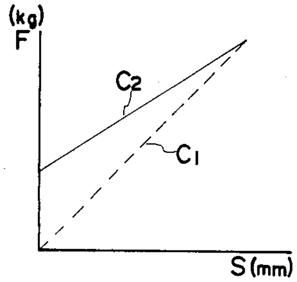
FIG. 27 is a graph showing the relation between a load applied to a nozzle tip and a stroke of a pivotal movement thereof.

When an initial load is applied to the springs 70, 70, with the pivotable plate 38, which is pressed in the lateral pivoting direction, being resiliently supported thereby, aligning of the nozzle tip 14 with an initial joint starting point is successful even if the robot 2 vibrates during the period when a coating operation is not being carried out, since the springs 70, 70 urge the pivotable plate 38 with the same left and right loads and the same spring constants. When the coating operation is started with a load applied to the free end of the nozzle tip 14, a pivoting stroke S starts from 0 kg as in the graph $C_1$, which relates to a prior art coating apparatus, as shown in FIG. 27. In such a case, the free end portion of the nozzle 32 is subject to movement due to the vibration of the robot.

In order to deal with this problem, the pivotable plate 38 is stopped on one stopper 79 at an end of a required pivoting stroke as shown in FIG. 26, to then move the pivoting cylinders 66, 66 in the direction in which the gun body is pressed against the panel. As a result, a difference $F_1$ in load occurs in the left and right springs 70, 70, and the free end of the nozzle tip 14 can be urged in the desired nozzle-pressing direction to an extent corresponding to this difference $F_1$. Accordingly, the characteristics shown in the graph $C_2$ in FIG. 27 can be obtained, and a narrow bead can be sealed accurately.

Figure 28:
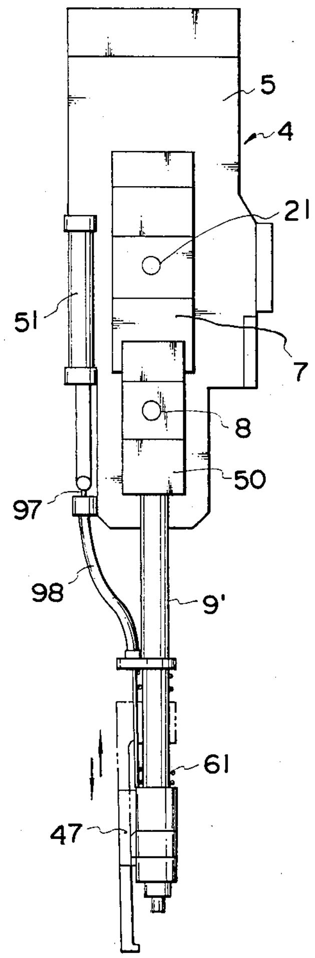
FIG. 28 is a front elevation of a fourth embodiment of a highly viscous material coating apparatus.
Figure 29:
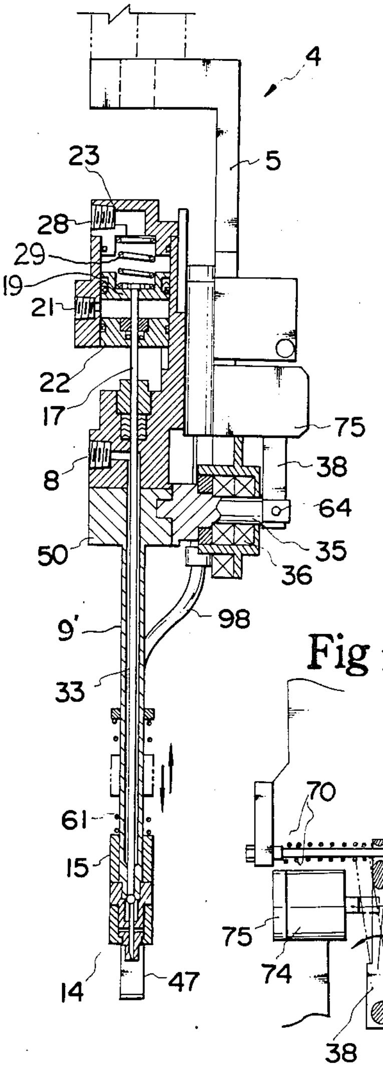
FIG. 29 is a side elevation, partly in section, of the embodiment of FIG. 28.
Figure 30:
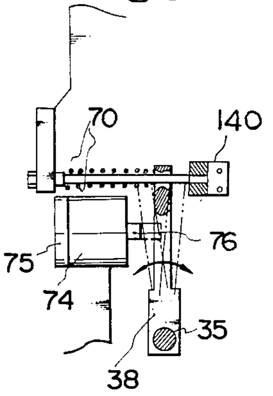
FIG. 30 is a rear elevation, partly in section, of a pivotal unit of the embodiment of FIG. 28.

In an embodiment shown in FIGS. 28–30, high-pressure air is fed through an air pipe from a high-pressure air source (not shown) to a guide cylinder 51 of the coating apparatus 4 to retract a rod and pull a control wire 97 which is connected directly to the rod and is disposed within an outer wire 98. Thus, the guide pin 47 is raised against the resilient force of the spring 61 to the position shown by double-dot chain lines in FIGS. 28, 29, so the nozzle tip 14 may be used alone in a sealing position. A pivotal movement restricting cylinder 74 is operated by high-pressure air to move its rod 76 in the forward direction, so that pivotable plate 38 is urged toward a guide rod bracket 140. Consequently, block 7 is turned around the axis of pivot 35, and the nozzle shaft 9' is pivoted accordingly. An instruction for carrying out a coating operation is then given to the robot 2. A sealing material and the high pressure air are supplied from a sealer supply port 8 and a gun-operating air supply port 21, respectively, to carry out a coating operation, with needle shaft 17 together with piston 19 being lifted against compression spring 29.

If a coating operation is carried out in this manner, the free end of the nozzle tip 14 can be moved in strict accordance with the actions of the robot 2, even on a floor which has no reference surfaces, i.e., even if there are no profiling operations. Moreover, since there are no interfering structures around the free end of the nozzle tip 14, the coating operation can be carried out over a wide range of area around the floor.

The operation for sealing a door panel 57 will now be described. In this sealing operation, the control wire 97 is set free without supplying the high-pressure air into the guide cylinder 51, and the guide pin 47 is moved downwardly in the drawing by the resilient force of the compression spring 61 to engage the reference surface of an edge which is substantially parallel to the sealing line, whereby the coating apparatus 4 compensates for any deviation of the robot 2 from the reproduction path and any error of the robot 2 with respect to the given instructions. Simultaneously with the above operation, the rod 76 of the pivotal movement restricting cylinder 74 is retracted by high-pressure air. The instructions for a coating operation are then supplied, and the operation is carried out with the pivotable plate 38 free to pivot to the left and to the right, as shown in FIG. 30.

The outer circumferential portion of the door panel 57 is hemmed as shown in FIG. 6 and FIG. 7, and the width W between the joint 59 and the outermost portion of the panel is 10–12 mm at substantially all portions thereof as previously mentioned, the coating operation being carried out as shown in FIG. 8.

The direction in which the coating apparatus 4 is to be turned is set at right angles to the seam and the guide pin 47 is pressed against the outer edge of the hemmed portion by the resilient force of the pivoting spring 70, a coating operation being carried out along this hemmed portion. Accordingly, the coating operation can be carried out accurately along the part of the panel which is a predetermined distance away from the edge thereof, even if the door panel 57 deviates from a proper position as shown by double-dot chain line in FIG. 8, and even if the locus of the robot deviates due to low accuracy of movement thereof. The range of application is limited to portions where the guide pin 47 has a reference surface.

The width W of the hemmed portion shown in FIG. 7 is 10–12 mm at substantially all sections thereof, a previously mentioned, but the width W at the bent section of the panel and an end section of the hemmed portion varies by up to around 5 mm in some cases.

Therefore, in order to automatically seal all the sections of the hemmed portion within the range of 5–12 mm, there is required a wide-range application sealer. This causes an increase in the quantity of the coating material in use.

Figure 31:
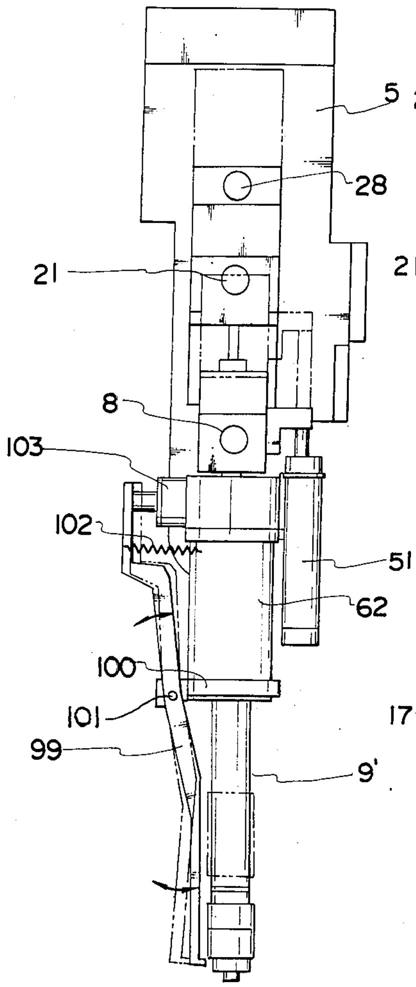
FIG. 31 is a front elevation of a fifth embodiment of a highly viscous material coating apparatus.
Figure 32:
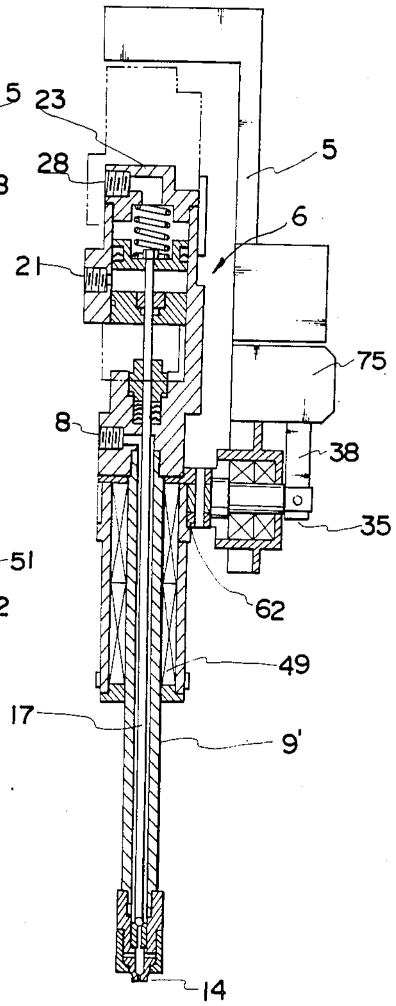
FIG. 32 is a side elevation, partly in section, of the embodiment of FIG. 31.
Figure 33:
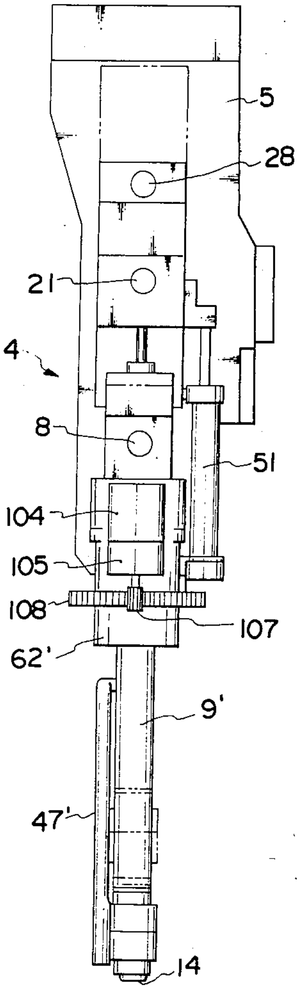
FIG. 33 is a front elevation of a sixth embodiment of a highly viscous material coating apparatus.
Figure 34:
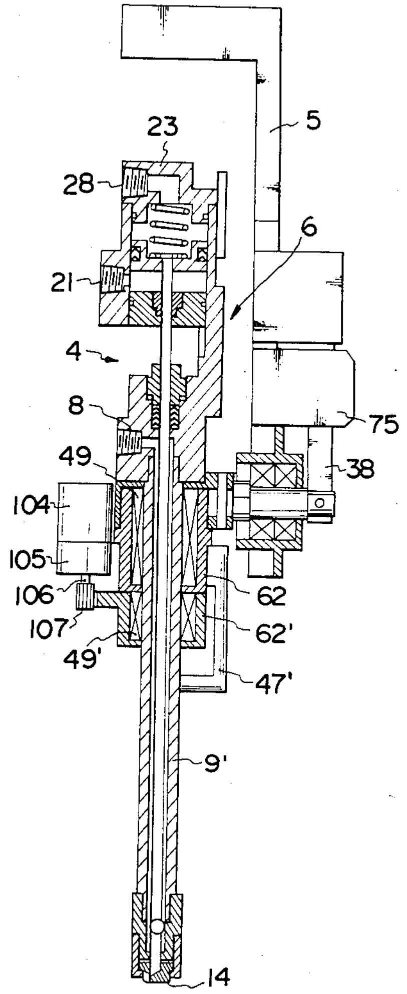
FIG. 34 is a side elevation, partly in section, of the embodiment of FIG. 33.

An embodiment, which is constructed so as to deal with this problem, and which is capable of minimizing the quantity of coating material used, will now be described with reference to FIGS. 31 and 32. This embodiment is different from the preceding embodiment in the following points. In the preceding embodiment, in which a vertically slidable guide pin 47 is employed, two modes are used selectively, as desired. In the first mode, the guide pin is moved axially by the guide cylinder 51 to a position in which it is used to guide the gun body along the edge of the joint, which is used as a reference surface. In the second mode, the coating is done by operation of the robot alone, without such a guiding operation. In the embodiment of FIGS. 31 and 32, sliding movement of the guide pin 47 is not used. In this embodiment, the above-mentioned coating modes are selectively obtained by axially moving the gun body 6 and nozzle tip 14, and by use of a swinging mechanism capable of varying the distance between the nozzle bore and a panel. The swinging mechanism operates the guide lever 99, which is used as a guide member.

In this embodiment, the diameter of the nozzle bore is set small to form a narrow sealing bead, and a spline groove (not shown) extends axially along the outer surface of the nozzle shaft 9'. On the upper portion of the nozzle shaft 9', a linear motion bearing 49 engages the spline groove and is disposed in a casing 62 so that the bearing 49 can slide in the axial direction of the nozzle shaft 9'. A pivot 35 extends from the casing 62.

A guide lever base 100 is fixed to the lower portion of the casing 62, and a guide lever 99 is supported on the guide lever base 100 by a lever pin 101 so that the guide lever 99 can turn around the pin 101, the free end of the guide lever 99 being positioned in the vicinity of the nozzle tip 14.

A guide lever spring 102 is provided between an upper portion of the guide lever 99 and casing 62 so that the upper portion of the guide lever 99 is drawn constantly toward the gun body 6. A guide lever control cylinder 103, which is an air cylinder, is fixed on one side of the casing 62, and a rod of this cylinder is adapted to engage and disengage the inner surface of the upper portion of the guide lever 99.

Operation of this embodiment will now be described. When this embodiment is used for coating a floor portion having no reference surfaces, high-pressure air is supplied from a high-pressure air source (not shown) into guide cylinder 51 through an air pipe to retract the rod thereof and extend the gun body 6, nozzle shaft 9' and nozzle tip 14 in the downward direction as shown by solid lines in the drawings. The pivotal movement restricting cylinder is operated in the same manner as in the preceding embodiment to give instructions to the robot 2 for carrying out a coating operation and practice the coating operation with the position and posture of the nozzle tip 14 restricted. Accordingly, the coating operation is carried out by the nozzle tip 14, which is opposed to a portion of the panel to be sealed, in accordance with the sealing actions of the robot 2.

In order to coat a door panel 57 with a sealer, the rod in the guide cylinder 51 is extended by high pressure air to retract, i.e. upwardly move, the nozzle tip and to position the same adjacent one side of the guide lever 99. Instructions for carrying out a coating operation are communicated to the robot 2, and the coating operation is carried out, with the rod in the pivotal movement restricting cylinder also being retracted by high-pressure air.

The coating operations at the edge of the door panel 57 in which the width W of the hemmed section varies as shown in FIG. 9 will now be described. In the region in which the width of the hemmed section is large, the rod in the guide lever control cylinder 103 is retracted to move the lower end of the guide lever 99 away from the nozzle tip 14, as shown by double-dot chain lines in the drawing, i.e., to move the nozzle bore away from the outer edge of the door panel 57. The coating operation is carried out as the nozzle bore is kept away from and moved with respect to the reference surface. In the region in which the width of the hemmed section is small, the rod in the guide lever control cylinder 103 is extended to move the lower end of the guide lever 99 near the nozzle bore as shown by solid lines in the drawing. The coating operation is carried out as the nozzle bore is brought close to and moved along with respect to the reference surface of the door panel. Accordingly, the sealing operation is carried out with the formation of a narrow sealer bead Therefore, coating of a predetermined portion of a door panel is carried out while the coating apparatus compensates for any deviation of the robot from the reproduction path thereof and any error of the robot with respect to its instructions.

A further embodiment which is capable of reliably obtaining the same effect as the preceding embodiment will now be described with reference to FIGS. 33-36. In a coating apparatus 4, a linear motion bearing 49 is disposed in a casing 62, which is provided on an upper portion of nozzle shaft 9'. Shaft 9' is rotable and axially slidable in bearing 49. The outer surface of shaft 9' is provided with a spline groove in the same manner as in the preceding embodiment. A rotary casing 62' is disposed below casing 62 so that the casing 62' can engage the casing 62 upon vertical movement of the casing 62', said vertical movement being limited by the casing 62. A bearing 49' has a turning-preventing member engaging the spline groove in the outer surface of the nozzle shaft 9', is disposed in rotary causing 62', and is fied against rotation with respect to casing 62'.

A servomotor 104 acting as a pivoting means and a potentiomenter 105, which are coaxially connected, are provided on the outer side of the casing 62. A pinion gear 107 is mounted on the free end portion of a common rotary shaft 106 of the servomotor 104 and potentiometer 105. Pinion 107 meshes with a partial gear 108 circumferentially formed on the outermost portion of the outer surface of the casing 62'. A guide rod 47', which extends downward to the nozzle tip 14, is fixed at one end thereof to the side surface of the casing 62.

Figure 35:
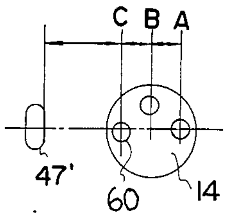
FIG. 35 is a bottom view of bores in a modification of a nozzle tip.
Figure 36:
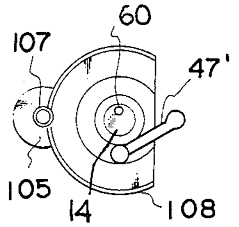
FIG. 36 is a bottom view of the nozzle tip of FIG. 35.

A discharge port 60 of the nozzle tip 14 is provided eccentrically as shown in FIG. 36, in such a manner that the discharge port may be turned relative to the guide rod 47'0 so as to approach guide rod 47' and to move away therefrom. As shown in FIG. 35, the distance between the guide rod 47' and discharge port 60 can be varied by the servomotor 104. Accordingly, the distance between the discharge port and a guide surface used as a reference surface for the guide rod 47' can be varied by turning the nozzle tip 14 with respect to the gun body 6.

With of the above-described embodiment, the coating operations by extension and contraction of the gun and by the movement of the robot to a floor portion of a panel are carried out in the same maner as in the preceding embodiment. The sealing of portions of the door panel 57 at which the width of the hemmed section varies as shown in FIG. 9 can be done in accordance with the width by using the servomotor 104, pinion 107 and partial gear 108 to turn the nozzle tip discharge port to the positions A, B, C shown in FIG. 35 when sealing is carried out for sections of the door panel which have a large width, an intermediate width and a small width, respectively.

In instructing the actions for coating the widthvarying sections shown in FIG. 9 of a hemmed portion of a door panel 57, the guide rod 47' is moved along the outer edge of the door, which is used as a reference surface. The profiling is done in accordance with the program for operation of the sealing unit, and the widths of various sections of the hemmed portion are memorized. The rotational positions, in which the distance between the nozzle tip discharge port 60 and guide rod 47' can be determined, are memorized as the position signals of the potentiometer. If the sealing unit and servomotor 104 are operated simultaneously while they are being properly controlled in accordance with these memorized signals, the coating operation can be carried out accurately along a joint 95 of the hemmed portion.

Figure 37:
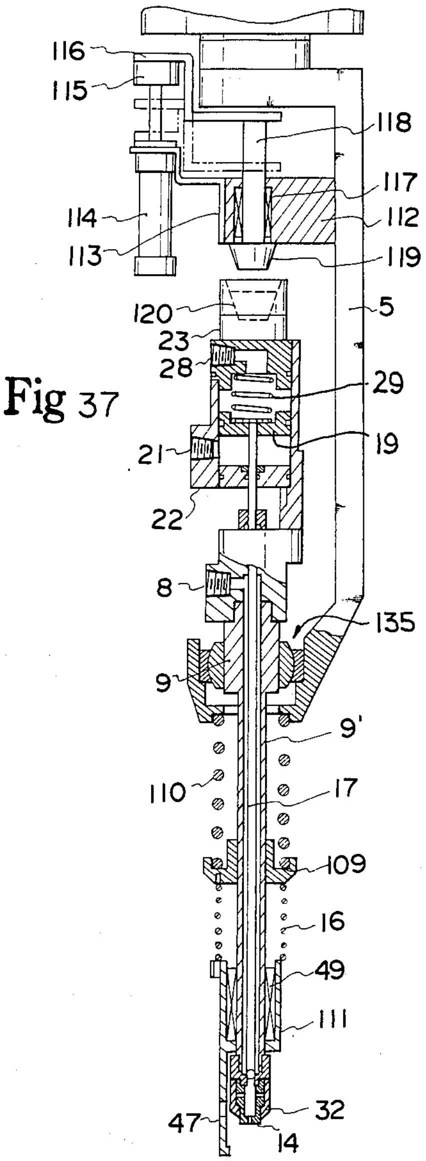
FIG. 37 is a side elevation, partly in section, of a seventh embodiment of a highly viscous material coating apparatus.

In an embodiment shown in FIG. 37, a gun extension 9 is supported on the lower end portion of a base plate 5 by a pivot in the form of a ball joint 135. A gun body block and a gun nozzle are fixed on the gun extension 9 so that the gun body block and gun nozzle can be turned unitarily through an angle of not more than 360°. Between the free end of the base plate 5 and a holder flange 109 fixed on an intermediate portion of nozzle shaft 9', a pivoting spring 110 is provided around the nozzle shaft 9' so as to resiliently support the nozzle 32.

A guide holder 111, carrying linear motion bearing 49, is disposed on the nozzle shaft 9' between holder flange 109 and nozzle 32. Guide pin 47 is formed integrally with the guide holder 111 and extends downward. The guide holder 111 can slide up and down along and in the axial direction of the nozzle shaft 9'. A spring 16 is provided around the nozzle shaft 9' so as to urge the guide pin 47 toward nozzle tip 14. The spring 16 is bent at its upper and lower ends, and the bends are inserted and locked in holes made in the holder flange 109 and guide holder 111 so as to assume a circumferentially-neutral posture.

A holder 112 is fixed on an intermediate portion of the base plate 5, and a cylinder 114 is mounted thereon by a bracket 113. A base end of a driving plate 116 is fixed on the free end of a rod of the cylinder 114 by a floating coupler 115. A shaft 118 is fixed on a free end of driving plate 116. A conical attachment 119 is fixed on the lower end of shaft 118. The shaft 118 is supported in the holder 112 by a sleeve 117 so that the shaft 118 can move vertically. The conical attachment 119 is adapted to selectively engage a conical receiving bore in an attachment receiver 120 provided on cap 23 of cylinder base 22 and therefore comprises a clamping unit.

In order to seal a predetermined portion of an automobile body 1 using a robot 2 and in accordance with the above-described embodiment, the following procedure is followed. High-pressure air is fed through an air pipe from a high-pressure air supply source (not shown) into the cylinder 114 to retract the rod and lower the shaft 118 through action of the floating coupler 115, which is connected directly to the rod, and the driving plate 116. Consequently, the attachment 119 is moved down into the receiving bore in the attachment receiver 120 until the driving plate 116 has been lowered to the position shown by double-dot chain lines in FIG. 37. This action directs the nozzle tip 14 alone to the sealing position. The robot is given instructions for carrying out a coating operation. A sealer is then supplied, with high-pressure air being supplied from a feed port 21 for the gun-operating air, and a coating operation is carried out with the needle shaft 17 raised by the piston 19 against the compression spring 29.

If the robot is operated in this manner, the free end of the nozzle tip 14 can be moved in strict accordance with the actions of the robot, and a wide-range coating operation can be carried out.

A sealing operation for the door panel assembly 57 will now be described. The cylinder 114 is operated in a manner opposite to that described above, i.e., the shaft 118 is raised by high-pressure air to free the nozzle shaft 9', so that the nozzle shaft 9' can be freely turned through 360°. The instructing and practicing of a coating operation are then carried out.

In a nozzle tip 14 according to the present invention, a frusto-conical tapering recess 122 is formed in the central section of the flat surface portion 121 at the free end thereof as shown in FIG. 38. As shown in FIG. 39, the recess 122 is provided at its base with an opening 124 and a stepped portion 123. Opening port 124 communicates with the supply passage 125 for the gun.

The angle $\theta$ of the tapering surface of the recess 122, the diameter $R_1$ of the stepped portion 123 at the base of the recess 122, the diameter $R_2$ of the opening 124 and the diameter $R_3$ of the free end of the recess 122 can be determined suitably and selectively in accordance with the conditions for use of the coating apparatus.

The highly-viscous material coating apparatus 4 of the above-described construction is set on a free end of a bendable multi-joint robot 2 as shown in FIG. 40. A highly-viscous sealing material 128 for a joint of a predetermined panel of a body of an automobile, for example, a joint of a panel of a roof drip 126 is applied by the nozzle tip 14 of the gun in the same manner as previously mentioned, i.e., in the following manner. The gun is directed to the joint of the roof drip in accordance with the set instructions, and sealer 128 is sucked from a tank 127 by a pump 129 and sent through a hose 130 and an accumulator 131. A coating operation is carried out accurately in a predetermined manner with the sealer being discharged linearly from the opening 124 of the nozzle tip 14.

The sealer 132 in FIG. 41, a highly-viscous material forming a coating bead, is ejected from the opening 124 in accordance with a program, and the ejection thereof is started and interrupted in a predetermined manner. A linear portion of the highly-viscous material 132 ejected from the opening 124 resides in the recess 122 with the side surface of the recess 122 peeled thereby due to the physical properties of the fluid, as shown in FIG. 41, this leftover sealer forming a drift of sealer 133.

When the quantity of the drift of leftover sealer 133 has exceeded a set capacity of the recess 122, the leftover sealer 133 is ready to drop or be peeled since the recess 122 is formed to the set capacity with respect to the extension of a flat surface portion 121 of the free end of the nozzle tip 14. As shown in FIG. 42, the drift of leftover sealer 132, which seems to fall or be peeled in view of its shape, is ejected as a drift 132' together with the linear portion 132 of the highly-viscous material. Since the linear portion 132 is ejected under a high pressure as mentioned previously, the drift 132' of leftover sealer does not separate from the linear portion 132 because of the viscosity of the material but is instead ejected unitarily as a swelled portion onto the sealer bead, as shown in FIG. 42.

The mode shown in FIG. 42 is a mode in which a drift 132' of leftover sealer occurring in the recess 122 is ejected together with the linear portion 132 during a process in which the sealer, a highly-viscous material, is ejected continuously from the nozzle tip 14. As mentioned above, ejection of the sealer from the nozzle tip 14 is started and interrupted under active control. Therefore, the sealer drift 132', left over in the recess 122 during the interruption of the ejection of the sealer 128, and nearly dropping at the time of a subsequent ejection of the sealer 128, is ejected unitarily with and as a drift of leftover sealer 132'', in a swelled state, which is attached to the front end of the linear portion of the highly viscous material which is being ejected, as shown in FIG. 43.

Accordingly, in any case, there is no possibility that a drift of leftover sealer will become separated from the linear portion 132 which is ejected from the free end of the nozzle tip 14, to drop onto a roof and a sealer bead or be scattered around.

The present invention is capable of sealing a joint of members, including automobile body panels which have a complicated configuration, with a desired accuracy in a coating step in an automobile manufacturing factory without being influenced by a fitting error, if any, of these members.

A commercially-available playback type industrial robot can be used "as is" for the sealing unit without providing the robot with any special modified control circuit. This enables the simplification of the construction of the sealing unit and the reduction of the weight thereof, the manufacturing cost thereof, and the space occupied thereby. This compact sealing unit can be installed simply and can be handled easily.

Since the limitation of the range in which the present invention can be applied to a coating operation is small, the number of special sealing units can be minimized. This enables minimization of the amount of maintenance work and the number of coating process controlling steps, and simplification and inexpensive operation of the coating system as a whole.

The coating speed can be increased in practice up to the limit level, so that the coating operation can be carried ou with high efficiency and with the number of instructing steps greatly reduced. Moreover, sealing in a coating step of a joint of members which are connected together in a complicated configuration can be accomplished with a narrow bead and a desired accuracy, substantially without being influenced by a fitting error of the members.

Since the axis of the rotary shaft of the wrist of a robot carrying three shafts can be aligned with the axis of the nozzle of the coating apparatus, the coating apparatus as a whole can be turned with these axes aligned. Accordingly, the distance between the nozzle bore and a hemmed portion, i.e. a reference surface, can be regulated by inclining the guide pin with respect to the reference surface. This enables a minute variation in the distance between a joint and a reference surface to be absorbed, and an accurate sealing operation with a narrow bead to be carried out. Moreover, the quantity of coating material used can be reduced, so that the material cost can be minimized accordingly.

Since the axis of the rotary shaft of the wrist of the robot and the axis of the nozzle can be aligned with each other, the coating apparatus as a whole can be turned by the robot without the necessity of providing the apparatus with a complicated means for moving the apparatus to and away from a workpiece. Therefore, even when the joint of a hemmed portion to be sealed is bent in a complicated manner, the coating of the bent joint can be done accurately, as the rate of ejection of the coating material is reduced.

A desired coating operation for each part to be coated can be carried out accurately in the abovementioned manner without obstruction of the gun by constituent members of the workpiece. Consequently, the accuracy of the products can be improved. The present invention enables a coating operation to be carried out in a versatile manner, not only by compensating for any fitting error of the members to be treated but also by restricting the pivotal movement of the coating means.

In the coating apparatus, in which the guide pin extends along the nozzle shaft and is joined to an actuator, with the guiding pin being prevented from turning with respect to the nozzle shaft, the deviation of the robot from the reproduction path and the deviation thereof from what is instructed can be eliminated by turning each coating apparatus on the basis of the profiling of the guide pin, using the hememd portion of a panel as a reference surface, during the sealing of the hemmed portion. This enables a desired portion of a workpiece to be coated accurately with an economical quantity of highly-viscous material. Even when the members to be treated have a fitting error, a desired coating operation can be carried out accurately with the fitting error being compensated for in all directions.

In the case where the profiling at the hemmed portion of a workpiece can be done accurately with a compression spring provided between the nozzle shaft and guide pin, so-called operational rigidity does not occur, so the coating operation can be carried out accurately and easily.

A sealing operation based on the profiling actions of the nozzle provided on the gun body can be carried out, not only in one direction, as in a conventional apparatus of this kind, but also in the opposite direction, so the number of degrees of freedom with respect to the coating direction greatly increase.

The movements of the gun body in two directions can be controlled separately by a pivoting means and a transfer means so as to position the gun body properly. Accordingly, the position-restricting accuracy of the means for absorbing the deviation of the gun body is greatly improved.

The type of the sealing unit, such as a robot on which the coating apparatus is set, is not limited. The coating apparatus can be set on any playback type sealing unit via a mounting base. For example, the sealer hose for use in supplying a sealer to the gun body and the other hoses connected to the gun body rarely move. Therefore, these various types of hoses may be arranged compactly, and there is little possibility that the reaction force of these hoses will adversely affect the profiling operations.

Since a guide means, such as the guide pin extending alone the nozzle shaft, is joined to an axial driving means, the guide means can be operated to profile the hemmed portion of a workpiece as a reference surface during the sealing of the hemmed portion. Accordingly, a predetermined portion of a workpiece can be coated accurately as the coating apparatus compensates for deviation of the robot from the reproduction path and what from is instructed. Even when the members to be treated have a fitting error, a predetermined coating operation can be carried out accurately, as the fitting error is compensated by the coating apparatus.

The guide is connected to the means for moving the guide toward and away from the nozzle shaft. Hence, even when a joint of a hemmed portion is bent in a complicated manner, the operation for applying a coating material to the bent joint can be carried out accurately by reducing the discharge rate of the coating material. An eccentric discharge port is provided in the nozzle tip at the free end of the nozzle shaft, and the nozzle tip is connected to a pivoting means. Accordingly, the guide can be moved along the reference surface or portion of a workpiece, and a coating material can be applied to the workpiece in a desired manner. Moreover, if the pivoting means is operated to turn the nozzle tip along the reproduction path with the discharge port moving close to and away from the guide, the coating or ejection operation can be carried out in strict accordance with the complicated bent joint of the hemmed portion of a panel with a smaller quantity of coating material.

According to the present invention, the possibility can be eliminated of the accidental occurrence of scatter and drop of a drift of leftover highly-viscous material, such as a sealer, which would cause a decrease in the accuracy of the surface of a product and aesthetic harm to the same surface, and the desired accuracy and beauty of a product can be maintained.

Since it is unnecessary that the circumferential portion of the free end of the nozzle of the gun in the coating apparatus be wiped frequently, secondary troublesome work can be omitted, and, moreover, interruption of a coating operation due to a nozzle tip cleaning operation does not occur. Therefore, the improved efficiency of a coating operation can be maintained.

A coating operation using the coating apparatus set on a robot can thus be carried out as designed and in a desired manner. While a highly-viscous material is ejected, it positively enters a recess in the free end portion of the nozzle and resides therein in quantity, so that excess highly-viscous material does not fall or scatter. When the quantity of the highly-viscous material being ejected has exceeded the capacity of the recess bore, the excess material is mixed in with the linear portion of the material and is discharged together to form a desired bead.

The coating apparatus can be prepared merely by forming a tapering recess in the small-diameter port of a nozzle end in an existing coating apparatus so that the recess converges with respect to the supply passage. Therefore, no special equipment is required, and the manufacturing cost is substantially equal to that of a conventional apparatus of this kind. Moreover, no troublesome work is required, such as maintenance, inspection and repair work. Coating apparatus having such a nozzle also can be used for the purposes for which a conventional apparatus of this kind is used, i.e. the former apparatus has an increased range of application.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A highly-viscous material coating apparatus adapted to be mounted on a unit for supplying the highly-viscous material to said apparatus and for supporting said apparatus, said apparatus comprising:

a base plate fixed on said unit;

a gun body having a highly-viscous material supply port, a nozzle shaft and a nozzle disposed at an end of said nozzle shaft, said nozzle being in fluid communication with said supply port;

pivoting means for pivotally mounting said gun body on said base plate for pivotal motion in a plane with respect to said base plate;

a pivotable plate fixed on said pivoting means and comprising means such that a pivotal motion of said pivotable plate will cause said gun body to pivot in said plane;

at least one compressing spring for biasing said pivotable plate;

means fixed on said base plate for at least partially restricting, selectively, the pivoting of said gun body;

a guide pin mounted on said gun body for contacting a workpiece for guiding said nozzle in response to said contact with said workpiece; and lift means for lifting said guide pin relative to said nozzle.

2. The apparatus of claim 1, wherein said at least one compression spring is disposed on a first side of said pivotable plate.

3. The apparatus of claim 2, further comprising an additional compression spring disposed on a second side of said pivotable plate that is opposite to said first side.

4. The apparatus of claim 1, further comprising a stopper mounted on said base plate for establishing a limit of motion of said pivotable plate.

5. The apparatus of claim 1, wherein said lift means is provided on said base plate.

6. The apparatus of claim 1, wherein said nozzle comprises a nozzle tip having a bore for dispensing said highly-viscous material, said bore being eccentric with respect to a center line of said nozzle shaft.

7. The apparatus of claim 6, further comprising turning means provided on said gun body for turning said nozzle tip.

8. The apparatus of claim 1, wherein said gun body is supported on said base plate by a ball bearing joint.

9. The apparatus of claim 1, wherein said nozzle comprises a nozzle tip having a bore therein for dispensing said highly-viscous material, said bore terminating in a tapering recess formed in said nozzle tip, said recess comprising means for retaining a drip of said highly-viscous material when the flow of said highly-viscous material is stopped.

10. A highly-viscous material coating apparatus mounted on a unit comprising means for supplying the highly-viscous material to said coating apparatus and a robot having a robot arm for supporting and manipulating said coating apparatus, said coating apparatus comprising:

a base plate fixed on said robot arm of said robot;

a gun body having a highly-viscous material supply port, a nozzle shaft and a nozzle disposed at an end of said nozzle shaft, said nozzle being in fluid communication with said supply port;

pivoting means for pivotally mounting said gun body on said base plate for pivotal motion about an axis substantially transverse to the length of said nozzle shaft and in a plane with respect to said base plate;

a pivotable plate fixed on said pivoting means and comprising means such that a pivotal motion of said pivotable plate will cause said gun body to pivot in said plane;

at least one compression spring for biasing said pivotable plate; and means fixed on said base plate for at least partially restricting, selectively, the pivoting of said gun body.

11. A highly-viscous material coating apparatus adapted to be mounted on a unit for supplying the highly-viscous material to said apparatus and for supporting said apparatus, said apparatus comprising:

a base plate fixed on said unit;

a gun body having a highly-viscous material supply port, a nozzle shaft and a nozzle disposed at an end of said nozzle shaft, said nozzle being in fluid communication with said supply port;

pivoting means for pivotally mounting said gun body on said base plate for pivotal motion in a plane with respect to said base plate;

a pivotable plate fixed on said pivoting means and comprising means such that a pivotal motion of said pivotable plate will cause said gun body to pivot in said plane;

at least one compressing spring for biasing said pivotable plate;

means fixed on said base plate for at least partially restricting, selectively, the pivoting of said gun body; and a linear motion bearing, said nozzle shaft being slidingly received in said linear motion bearing, further comprising a spline and spline groove for preventing relative rotation of said nozzle shaft and said linear motion bearing.

* * * * *